US012633561B2

(12) United States Patent
Park et al.

(10) Patent No.: US 12,633,561 B2
(45) Date of Patent: May 19, 2026

(54) ADDITIVE HAVING A PERVOSKITE COMPOUND FOR A POLYMER ELECTROLYTE MEMBRANE FUEL CELL AND A POLYMER ELECTROLYTE MEMBRANE FUEL CELL INCLUDING SAME

(71) Applicants: HYUNDAI MOTOR COMPANY, Seoul (KR); KIA CORPORATION, Seoul (KR); Daegu Gyeongbuk Institute of Science and Technology, Daegu (KR)

(72) Inventors: Kweon Ju Park, Hwaseong-si (KR); Ju Ahn Park, Seongnam-si (KR); Sangaraju Shanmugam, Daegu (KR); Da Bin Han, Gwangju (KR); Hyeon Jin You, Daegu (KR)

(73) Assignees: HYUNDAI MOTOR COMPANY, Seoul (KR); KIA CORPORATION, Seoul (KR); Daegu Gyeongbuk Institude of Science and Technology, Daegu (KR)

( * ) Notice: Subject to any disclaimer, the term of this patent is extended or adjusted under 35 U.S.C. 154(b) by 441 days.

(21) Appl. No.: 18/078,534

(22) Filed: Dec. 9, 2022

(65) Prior Publication Data

US 2023/0343977 A1    Oct. 26, 2023

(30) Foreign Application Priority Data

Apr. 26, 2022    (KR) ........................ 10-2022-0051127

(51) Int. Cl.
H01M 8/1051 (2016.01)
H01M 8/10 (2016.01)
H01M 8/1081 (2016.01)

(52) U.S. Cl.
CPC ....... H01M 8/1051 (2013.01); H01M 8/1081 (2013.01); H01M 2008/1095 (2013.01)

(58) Field of Classification Search
CPC ............. H01M 8/1051; H01M 8/1081; H01M 1/1018; H01M 8/1046; H01M 8/1048; H01M 8/1039
See application file for complete search history.

(56) References Cited

U.S. PATENT DOCUMENTS 4,933,230 A * 6/1990 Card .................... H10N 30/852
428/401
10,424,801 B2 9/2019 Higashino et al.
(Continued)

FOREIGN PATENT DOCUMENTS

JP          6642446 B2      1/2020
KR    20160022340 A       2/2016
(Continued)

OTHER PUBLICATIONS

Wang Yanping, et al. "Preparation and characterization of MZr_ (0.5) Ti_ (0.5) O_3 (M=Pb, Nd) piezoelectric ceramics." Journal of Zhejiang Sci-Tech University: Natural Science Edition 31.4 (2014): 397-400 (Year: 2014).*
(Continued)

*Primary Examiner* — Osei K Amponsah
*Assistant Examiner* — Amanda Rosenbaum
(74) *Attorney, Agent, or Firm* — Lempia Summerfield Katz LLC

(57) ABSTRACT

Disclosed are an additive for a polymer electrolyte membrane fuel cell and a polymer electrolyte membrane fuel cell including the additive. The additive may include a carbon material having a predetermined shape and a perovskite compound having the formula $Ce(Zr_xTi_{1-x})O_3$, wherein x
(Continued)

satisfies 0<x<1, and wherein the perovskite compound is deposited on the carbon material.

6 Claims, 3 Drawing Sheets

(56)                    References Cited

U.S. PATENT DOCUMENTS

| | | | |
|---|---|---|---|
| 11,349,140 B2 | 5/2022 | Ko et al. | |
| 2004/0110051 A1* | 6/2004 | Srinivas | H01M 4/96 |
| | | | 252/511 |
| 2008/0166620 A1* | 7/2008 | Fuller | H01M 4/8657 |
| | | | 429/479 |
| 2012/0088029 A1* | 4/2012 | Seo | H01M 4/0402 |
| | | | 427/126.4 |
| 2012/0088144 A1* | 4/2012 | Lee | H01M 50/434 |
| | | | 429/144 |
| 2016/0149229 A1 | 5/2016 | Li et al. | |
| 2017/0317371 A1 | 11/2017 | Higashino et al. | |
| 2018/0323447 A1* | 11/2018 | Imamura | C23C 28/04 |
| 2020/0020967 A1 | 1/2020 | Ko et al. | |
| 2021/0135242 A1 | 5/2021 | Kim et al. | |

FOREIGN PATENT DOCUMENTS

| | | | |
|---|---|---|---|
| KR | 20200006387 A | 1/2020 | |
| KR | 20210051185 A | 5/2021 | |
| KR | 20210101131 A | 8/2021 | |
| WO | WO-2021181085 A1 * | 9/2021 | H01M 4/926 |

OTHER PUBLICATIONS

Lin, Y., J. W. Shaffer, and H. A. Sodano. "Electrolytic deposition of PZT on carbon fibers for fabricating multifunctional composites." Smart materials and structures 19.12 (2010): 124004. (Year: 2010).*
Sue Hao et al., Preparation and dielectric properties of Ce-doped Ba(ZrxTi12x)O3 ceramics, Res Chem Intermed, Oct. 5, 2013, 8pp., 10.1007/s11164-013-1418-3.

* cited by examiner

ADDITIVE HAVING A PERVOSKITE COMPOUND FOR A POLYMER ELECTROLYTE MEMBRANE FUEL CELL AND A POLYMER ELECTROLYTE MEMBRANE FUEL CELL INCLUDING SAME

CROSS-REFERENCE TO RELATED APPLICATION

This application claims under 35 U.S.C. § 119(a) the benefit of and priority to Korean Patent Application No. 10-2022-0051127, filed on Apr. 26, 2022, the entire contents of which are incorporated herein by reference.

BACKGROUND

(a) Technical Field

The present disclosure relates to an additive for a polymer electrolyte membrane fuel cell, where the additive includes a perovskite compound. The disclosure further relates to a polymer electrolyte membrane fuel cell including such an additive.

(b) Background Art

The statements in this section merely provide background information related to the present disclosure and may not constitute prior art.

A polymer electrolyte membrane fuel cell (PEMFC) is a device that converts chemical energy into electrical energy. The polymer electrolyte membrane fuel cell includes an anode that is an oxidation electrode, a cathode that is a reduction electrode, and an electrolyte membrane interposed between the anode and the cathode.

A hydrogen oxidation reaction (HOR) and an oxygen reduction reaction (ORR) occur at the anode and the cathode respectively. However, because the rate of the oxygen reduction reaction (ORR) is slower than that of the hydrogen oxidation reaction (HOR), which greatly affects the performance of the fuel cell, many studies are being conducted to increase the reaction rate of the oxygen reduction reaction (ORR).

Meanwhile, the electrolyte membrane includes a perfluorinated sulfonic acid-based polymer such as Nafion. However, the perfluorinated sulfonic acid-based polymer has a detrimental effect on the performance of the fuel cell because moisture retention and hydrogen ion conductivity are lowered in a low-humidity environment. Further, free radicals resulting from hydrogen peroxide ($H_2O_2$) produced during the catalytic reaction attack the electrolyte membrane, and deterioration of the electrolyte membrane proceeds much faster under low-humidity conditions compared to humidified environments. In order to remove the free radicals, there is a study of introducing antioxidants such as cerium oxide ($CeO_2$) and the like into the electrolyte membrane. However, antioxidants have problems in that they lower the hydrogen ion conductivity of the electrolyte membrane and cause leaching when the fuel cell is operated for a long time.

SUMMARY

An object of the present disclosure is to provide a polymer electrolyte membrane fuel cell having excellent chemical durability and stability.

The objects of the present disclosure are not limited to the object mentioned above. The objects of the present disclosure become clearer from the following description, and are realized by means and combinations thereof described in the claims.

An additive for a polymer electrolyte membrane fuel cell according to one embodiment of the present disclosure may include a perovskite compound represented by $Ce(Zr_xTi_{1-x})O_3$, wherein x satisfies $0<x<1$.

The additive may further include a carbon material having a predetermined shape, and the perovskite compound may be deposited on the carbon material.

The carbon material may include a spherical carbon material, a fibrous carbon material, or a combination thereof.

The perovskite compound may have an X-ray diffraction (XRD) peak on the (110) plane, (112) plane, (200) plane, (122) plane, and (220) plane.

The perovskite compound may have a peak at a (110) plane, a peak at a (112) plane, a peak at a (200) plane, a peak at a (122) plane, and a peak at a (220) plane as measured by X-ray diffraction (XRD), A polymer electrolyte membrane fuel cell according to one embodiment of the present disclosure may include: an electrolyte membrane; a cathode disposed on one surface of the electrolyte membrane; and an anode disposed on the other surface of the electrolyte membrane, wherein the electrolyte membrane, the cathode, the anode, or a combination thereof may include the additive as disclosed herein.

The electrolyte membrane may include 98% by weight to 99.5% by weight of an ionomer and 0.5% by weight to 2% by weight of the additive.

The cathode may include: a catalyst in which an active metal is supported on a support; an ionomer; and the additive as disclosed herein.

A preparation method of an additive for a polymer electrolyte membrane fuel cell according to one embodiment of the present disclosure may include: preparing a starting material including a cerium precursor, a zirconium precursor, and a titanium precursor; spinning the starting material to obtain a product having a predetermined shape; and applying heat and pressure to the product to obtain an additive, wherein the additive may include a perovskite compound represented by $Ce(Zr_xTi_{1-x})O_3$, wherein x satisfies $0<x<1$.

The starting material may further include a carbon precursor, wherein the additive may further include a carbon material having a predetermined shape, and the perovskite compound may be deposited on the carbon material.

The additive may be prepared by treating the product at a temperature in a range of 500° C. to 1,000° C. and at a pressure in a range of 200 bar to 760 bar.

According to the present disclosure, a polymer electrolyte membrane fuel cell having excellent chemical durability and stability can be obtained.

The effects of the present disclosure are not limited to the above-mentioned effect. It should be understood that the effects of the present disclosure include all effects that can be inferred from the following description.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION

The above objects, other objects, features, and advantages of the present disclosure are understood through the following embodiments related to the accompanying drawings. However, the present disclosure is not limited to the embodiments described herein and may be embodied in other forms. Rather, the embodiments introduced herein are provided so that the disclosed content may become thorough and complete, and the spirit of the present disclosure may be sufficiently conveyed to those skilled in the art.

In the present specification, terms such as "comprise," "have," etc. are intended to designate that a feature, number, step, operation, component, part, or a combination thereof described in the specification exists, but it should be understood that the terms do not preclude the possibility of the existence or addition of one or more other features, numbers, steps, operations, components, parts, or combinations thereof. Further, when a part of a layer, film, region, plate, etc. is said to be "on" other part, this includes not only the case where it is "directly on" the other part but also the case where there is another part in the middle thereof. Conversely, when a part of a layer, film, region, plate, etc. is said to be "under" other part, this includes not only the case where it is "directly under" the other part, but also the case where there is another part in the middle thereof.

Unless otherwise specified, because all numbers, values, and/or expressions expressing quantities of components, reaction conditions, polymer compositions and formulations used in the present specification are approximate values reflecting various uncertainties of the measurement that arise in obtaining these values among others in which these numbers are different, they should be understood as being modified by the term "about" in all cases. Further, when a numerical range is disclosed in this description, such a range is continuous, and includes all values from a minimum value of such a range to a maximum value including the maximum value, unless otherwise indicated. Furthermore, when such a range refers to an integer, all integers including from a minimum value to a maximum value including the maximum value are included, unless otherwise indicated.

Figure 1:
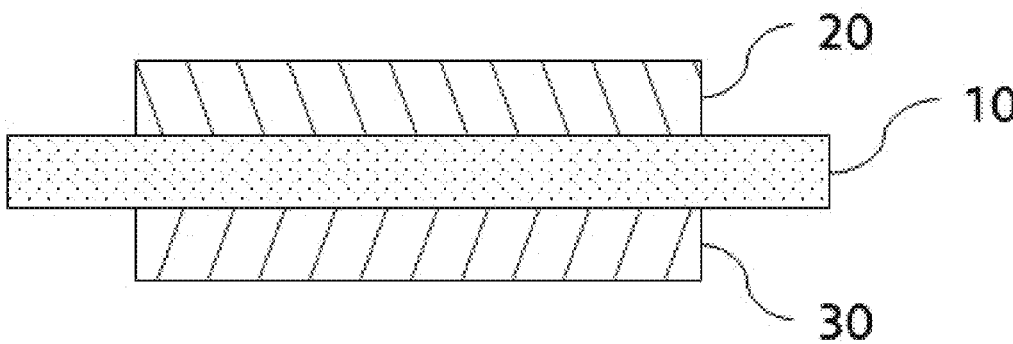
FIG. 1 shows a polymer electrolyte membrane fuel cell according to an embodiment of the present disclosure.

FIG. 1 shows a polymer electrolyte membrane fuel cell (hereinafter, 'fuel cell') according to an embodiment of the present disclosure. The fuel cell may include an electrolyte membrane 10, a cathode 20 disposed on one surface of the electrolyte membrane 10, and an anode 30 disposed on the other surface of the electrolyte membrane 10. The electrolyte membrane 10, the cathode 20, the anode 30, or a combination thereof may include an additive according to the present disclosure.

The additive may include a carbon material having a predetermined shape and a perovskite compound deposited on the carbon material.

The carbon material may have at least one shape of a spherical shape and a fibrous shape. When a carbon material having a spherical and/or a fibrous shape is added to the cathode 20 and/or the anode 30, the dispersibility of the catalyst may be increased, and pores may be easily formed. Due to this, the speed of mass transfer within the electrode may be increased, and the problems of flooding phenomenon occurred when humidity is high and a drop in moisture retention occurred when humidity is low may be solved.

The perovskite compound may include one represented by $Ce(Zr_xTi_{1-x})O_3$, wherein x may satisfy $0 < x < 1$.

The perovskite compound may increase the reaction rate of the oxygen reduction reaction (ORR) because the compound can be an oxygen reservoir while providing a site for ions to stay as an oxygen vacancy.

Meanwhile, the perovskite compound includes three or more metal elements, and due to different material properties and ionic sizes of the respective metal elements, the perovskite compound has more oxygen vacancies compared to the conventional perovskite material including two metal elements. Accordingly, the perovskite compound may further increase the reaction rate of oxygen reduction reaction (ORR). Further, the self-oxidation reduction ability of the cerium (Ce) element is improved depending on the amount of oxygen vacancies, and thus the antioxidant properties of the additive are improved.

The cerium (Ce) element included in the perovskite compound has self-oxidation reduction properties, and thus serves as a radical scavenger. The zirconium (Zr) element increases chemical stability and hygroscopicity. The titanium (Ti) element may increase mechanical stability and water retention capacity.

The preparation method of the additive according to the present disclosure may include preparing a starting material including a carbon precursor, a cerium precursor, a zirconium precursor, and a titanium precursor; spinning the starting material to obtain a product having a predetermined shape; and applying heat and pressure to the product to obtain the additive.

The carbon precursor is not particularly limited. For example, it may include polyacrylonitrile (PAN).

The cerium precursor is not particularly limited. For example, it may include cerium(III) acetylacetonate.

The zirconium precursor is not particularly limited. For example, it may include titanium(IV) oxyacetylacetonate.

The titanium precursor is not particularly limited. For example, it may include zirconium(IV) acetylacetonate.

The starting material may be prepared by adding the carbon precursor into a solvent, and adding the cerium precursor, the zirconium precursor, and the titanium precursor in appropriate amounts suitably for the desired composition of the perovskite compound.

The solvent is not particularly limited. For example, it may include dimethylformamide (N,N-Dimethylformamide, DMF).

The product having a predetermined shape may be prepared by spinning the starting material. The spinning method is not particularly limited, and the product may be obtained through wet electrospinning. During electrospinning, the product may be formed in a spherical shape, or a linear product may be formed in a spherical shape by pulverizing it under appropriate conditions.

Thereafter, heat and pressure may be applied to the product to synthesize a perovskite compound. Specifically, the additive may be prepared by treating the product at a temperature in a range of 500° C. to 1000° C. and at a pressure in a range of 200 bar to 760 bar under an oxygen-lean airflow. The oxygen-lean airflow may be formed by injecting an inert gas such as nitrogen, argon, or the like, and then sealing a reactor. The method of applying heat and pressure is not particularly limited, but the product may be sealed through, for example, a Swagelok system, and then heat and pressure may be applied thereto.

When the additive according to the present disclosure is applied to the electrolyte membrane 10, the chemical durability and hydrogen ion conductivity of the electrolyte membrane may be increased. Further, when the additive is applied to the cathode 20, the performance of the fuel cell may be improved by increasing the reaction rate of the oxygen reduction reaction (ORR).

The electrolyte membrane 10 may include an ionomer and the additive.

The ionomer may include a perfluorinated sulfonic acid-based polymer such as Nafion.

The electrolyte membrane 10 may include 98% by weight to 99.5% by weight of the ionomer and 0.5% by weight to 2% by weight of the additive.

The cathode 20 may include a catalyst in which an active metal is supported on a support, an ionomer, and the additive as disclosed herein.

The type of the support is not particularly limited, but the support may include, for example, carbon black, carbon nanotube, graphite, graphene, carbon fiber, carbon nanowire, or combinations thereof.

The type of the active metal is not particularly limited, but the active metal may include, for example, noble metals such as platinum (Pt), palladium (Pd), iridium (Ir), and/or ruthenium (Ru). Further, the active metal may further include transition metals such as copper (Cu), cobalt (Co), nickel (Ni), and/or iron (Fe). The active metal may include mixtures of the noble metals and the transition metals, or alloys thereof.

The ionomer may include a perfluorinated sulfonic acid-based polymer such as Nafion.

The anode 30 may include a catalyst in which an active metal is supported on a support, an ionomer, and the additive.

The type of the support is not particularly limited, but the support may include, for example, carbon black, carbon nanotube, graphite, graphene, carbon fiber, carbon nanowire, or combinations thereof.

The type of the active metal is not particularly limited, but the active metal may include, for example, noble metals such as platinum (Pt), palladium (Pd), iridium (Ir), and/or ruthenium (Ru). Further, the active metal may further include transition metals such as copper (Cu), cobalt (Co), nickel (Ni), and/or iron (Fe). The active metal may include mixtures of the noble metals and the transition metals, or alloys thereof.

The ionomer may include a perfluorinated sulfonic acid-based polymer such as Nafion.

Hereinafter, the present disclosure is described in more detail through Examples. However, the following Examples are merely examples to help the understanding of the present disclosure, and the scope of the present disclosure is not limited thereto.

Preparation Example 1 g of polyacrylonitrile (PAN), 0.1124 g of cerium(III) acetylacetonate, 0.0749 g of titanium(IV) oxyacetylacetonate, and 0.0140 g of zirconium(IV) acetylacetonate were put into 9 ml of dimethylformamide (DMF) as a solvent to prepare a starting material.

A product was prepared by electrospinning the starting material. An additive was prepared by applying heat and pressure to the product using a Swagelok system. At this time, the internal temperature of the Swagelok system was about 1000° C., the preparation process was carried out at an arbitrary pressure in a range of 200 bar to 760 bar depending on the temperature.

Comparative Preparation Example

An additive was prepared in the same manner as in Preparation Example except that the zirconium precursor was not put.

Figure 2:
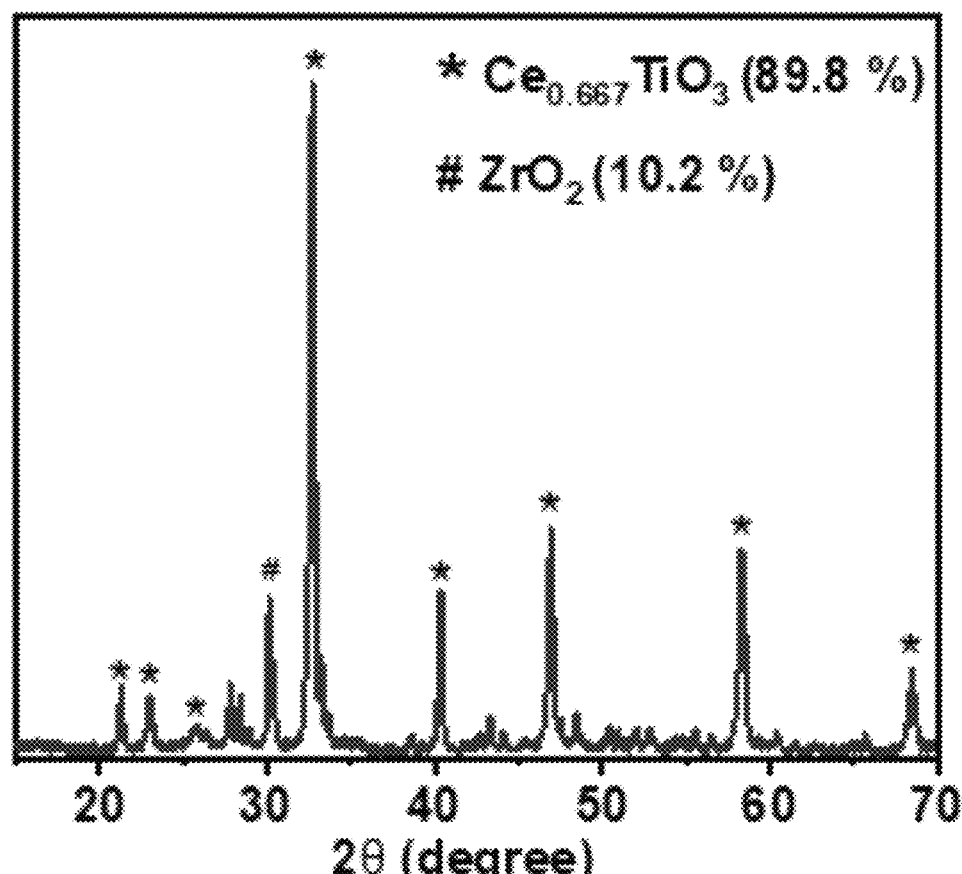
FIG. 2 shows an X-ray diffraction analysis result of an additive according to Preparation Example.

FIG. 2 shows an X-ray diffraction analysis result of the additive according to Preparation Example. Referring to this, it can be seen that the additive has peaks at a (110) plane, a (112) plane, a (200) plane, a (122) plane and a (220) plane. Here, the peak at the (110) plane is a peak found at $2\theta=32.7°\pm0.5°$. The peak at the (112) plane is a peak found at $2\theta=40°\pm0.5°$. The peak at the (200) plane is a peak found at $2\theta=47°\pm0.5°$. The peak at the (122) plane is a peak found at $2\theta=58°\pm0.5°$. The peak at the (220) plane is a peak found at $2\theta=68°\pm0.5°$.

Figure 3A:
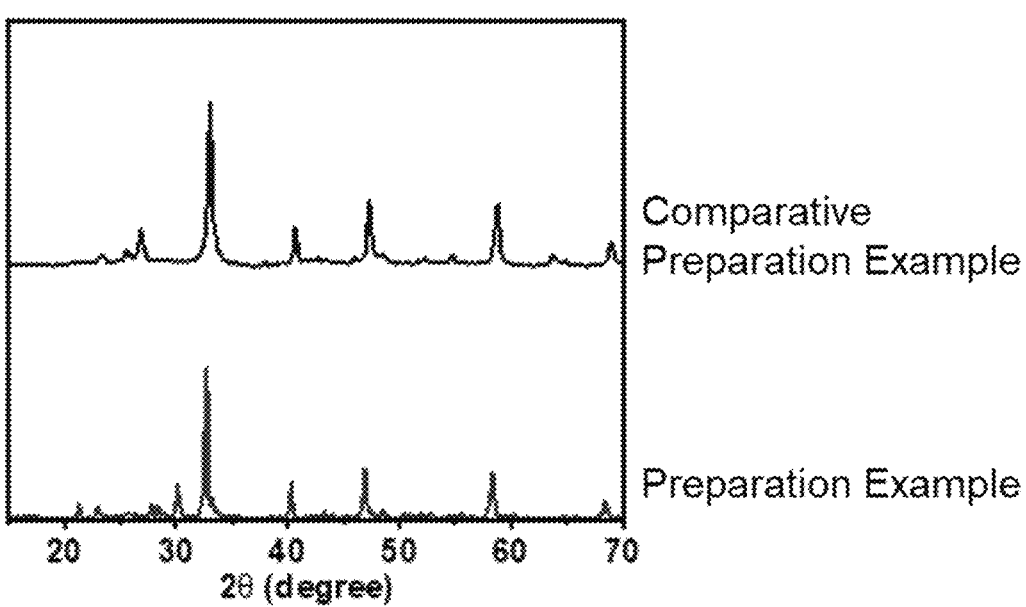
FIG. 3A shows X-ray diffraction analysis results of additives according to Preparation Example and Comparative Preparation Example.
Figure 3B:
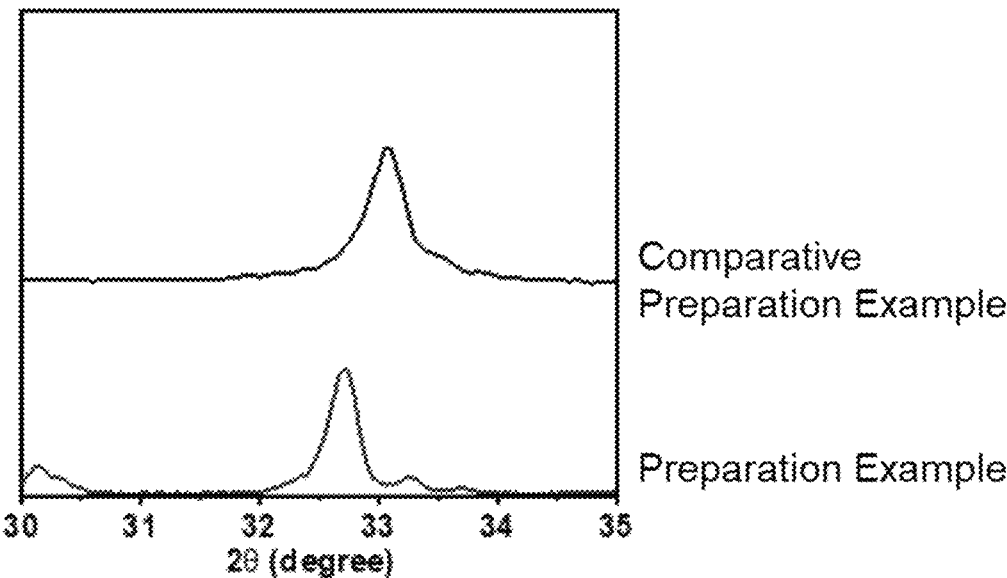
FIG. 3B shows enlarged parts of the (110) plane peaks of FIG. 3A.

FIG. 3A shows X-ray diffraction analysis results of additives according to Preparation Example and Comparative Preparation Example. FIG. 3B shows enlarged parts of the peak at the (110) plane of FIG. 3A. Referring to this, it can be seen that the peak at the (110) plane is downshifted in Preparation Example compared to Comparative Preparation Example in which zirconium (Zr) is not substituted. The radius of $Zr^{4+}$ is 0.72 Å and that of $Ti^{4+}$ is 0.605 Å, and it is considered that the peak shifts to a low angle as the lattice expands by replacing $Ti^{4+}$ with $Zr^{4+}$.

Referring to FIGS. 2 and 3A, in the additive according to Preparation Example, a peak due to a small amount of zirconium oxide ($ZrO_2$) was confirmed, but it can be confirmed from about 90% of the perovskite structure and the shift of the diffraction peak that $Zr_4^+$ ions were well introduced into the B site of the perovskite structure of $ABO_3$.

Figure 4:
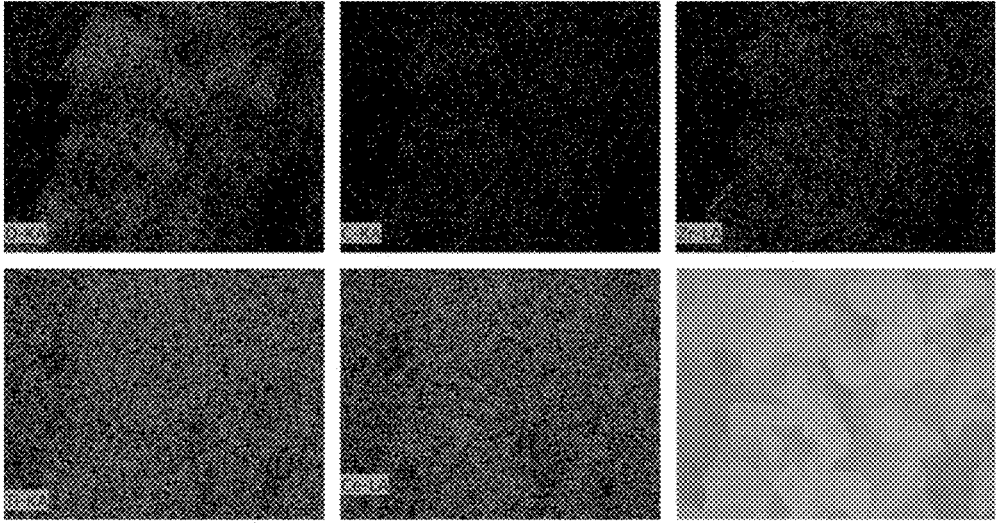
FIG. 4 shows results of analyzing the additive according to Preparation Example by the Energy Dispersive X-Ray (EDX) analysis mapping function of a Field Emission Scanning Electron Microscope (FE-SEM).

FIG. 4 shows results of analyzing the additive according to Preparation Example by the Energy Dispersive X-Ray (EDX) analysis mapping function of a Field Emission Scanning Electron Microscope (FE-SEM). Referring to this, it can be seen that oxygen, carbon, zirconium, titanium, and cerium are uniformly dispersed in the additive.

Example

Nafion, which is an ionomer, was mixed with the additive according to Preparation Example, sonicated for about 1 hour, and then stirred for about 7 hours. In this process, interaction between the sulfonic acid group of Nafion and the perovskite compound of the additive occurs. The amount of the additive was adjusted to 0.5% by weight. After finishing stirring, the resulting product was cast on a glass plate, and the solvent was completely evaporated to obtain an electrolyte membrane.

A fuel cell was manufactured by attaching a cathode and an anode including a catalyst and an ionomer to both surfaces of the electrolyte membrane.

Table 1 below is one obtained by measuring the hydrogen ion conductivity of the electrolyte membrane according to Example.

Table 2 below shows a result of evaluating the performance of the fuel cell according to Example under 80° C. and 100% relative humidity conditions. Table 3 shows a result of evaluating the performance of the fuel cell according to Example under 80° C. and 20% relative humidity conditions. The performance of the fuel cell was conditioned on a catalyst loading amount of 0.5 mg/cm² for the anode and the cathode respectively under a gas flow condition of $H_2:O_2$ of 1:1. Further, the area of the fuel cell was 5 cm².

As a comparative group, an antioxidant commonly used in a large amount was added instead of the additive according to Preparation Example and evaluated in the same manner.

TABLE 1

| Classification | Electrolyte component membrane | Electrolyte membrane thickness [μm] | Hydrogen ion conductivity [mS · cm⁻¹]@80° C. Relative humidity 100% | Relative humidity 20% |
|---|---|---|---|---|
| Comp. Example 1 | Nafion | 50 | 111.4 | 5.0 |
| Comp. Example 2 | Nafion + TiO₂ nanotube | 51 | 192.9 | 8.1 |
| Comp. Example 3 | Nafion + ZrO₂ nanotube | 49 | 189.6 | 7.9 |
| Comp. Example 4 | Nafion + Ti₂Zr₂O₈ nanotube | 50 | 207.9 | 9.4 |
| Comp. Example 5 | Nafion + CeO₂ nanotube | 52 | 176.0 | 7.4 |
| Comp. Example 6 | Nafion + CeO₂ nanoparticles | 51 | 148.9 | 3.2 |
| Example | Nafion + Additive according to the present disclosure | 51.8 | 248 | 7.5 |

TABLE 2

| Classification | Fuel cell performance 80° C., relative humidity 100% OCV [V] | MPD [mW · cm⁻¹] | PD at 0.6 V | MCD [mW · cm⁻¹] |
|---|---|---|---|---|
| Comparative Example 1 | 0.99 | 735 | 629 | 2,151 |
| Comparative Example 2 | 1.00 | 770 | 470 | 2,621 |
| Comparative Example 3 | 1.00 | 742 | 549 | 2,196 |
| Comparative Example 4 | 1.00 | 924 | 786 | 2,666 |
| Comparative Example 5 | 0.94 | 747 | 519 | 2,302 |
| Comparative Example 6 | 0.97 | 707 | 666 | 2,504 |
| Example | 0.93 | 1,166 | 968 | 2,825 |

TABLE 3

| Classification | Fuel cell performance 80° C., relative humidity 20% OCV [V] | MPD [mW · cm⁻¹] | PD at 0.6 V | MCD [mW · cm⁻¹] |
|---|---|---|---|---|
| Comparative Example 1 | 0.96 | 269 | 117 | 1,146 |
| Comparative Example 2 | 0.98 | 377 | 206 | 1,436 |
| Comparative Example 3 | 0.94 | 489 | 266 | 1,900 |
| Comparative Example 4 | 1.00 | 569 | 343 | 2,118 |
| Comparative Example 5 | 0.85 | 438 | 236 | 1,710 |

TABLE 3-continued

| Classification | Fuel cell performance 80° C., relative humidity 20% OCV [V] | MPD [mW · cm⁻¹] | PD at 0.6 V | MCD [mW · cm⁻¹] |
|---|---|---|---|---|
| Comparative Example 6 | 0.96 | 430 | 236 | 1,693 |
| Example | 0.90 | 630 | 440 | 1,421 |

In Tables 2 and 3, MPD refers to a maximum power density, PD refers to a power density, and MCD refers to a maximum current density.

Referring to Table 1, it can be seen that the electrolyte membrane according to Example exhibits the most excellent hydrogen ion conductivity when the relative humidity is 100%.

Referring to Tables 2 and 3, it can be seen that the performance of the fuel cell according to Example is significantly superior to those of Comparative Examples to which other antioxidants are added.

Table 4 below is one in which the characteristics of the electrolyte membrane according to Example are evaluated.

TABLE 4

| Classification | Moisture content [%] | Ion exchange capacity [meq/g] | Volumetric swelling degree [%] | Number of moles of water per sulfonic acid group [λ] | Oxidative stability [%] (12 hours) |
|---|---|---|---|---|---|
| Comp. Example 1 | 24.0 | 0.940 | 10.1 | 14.18 | 96.7 |
| Comp. Example 2 | 28.9 | 0.929 | 8.0 | 17.28 | 98.9 |
| Comp. Example 3 | 27.6 | 0.926 | 7.9 | 16.56 | 98.4 |
| Comp. Example 4 | 31.9 | 0.932 | 8.6 | 19.01 | 99.4 |
| Comp. Example 5 | 27.7 | 0.928 | 7.8 | 16.57 | 99.8 |
| Comp. Example 6 | 26.1 | 0.902 | 8.4 | 16.08 | 98.7 |
| Example | 26.9 | 0.912 | 6.8 | 16.39 | 99.8 (24 hours) |

The electrolyte membrane of Example showed the smallest degree of swelling at the same time as proper moisture control, and this is because the characteristic of dimensional stability was expressed from the perovskite compound.

The oxidation stability is a comparison between the mass of the first electrolyte membrane and the mass of the electrolyte membrane when radicals are made with a Fenton's reagent and reacted with each electrolyte membrane for 12 hours. Example showed the highest oxidative stability while maintaining a weight close to 100% up to about 24 hours beyond 12 hours.

As the Preparation Example and Example of the present disclosure have been described in detail above, the right scope of the present disclosure is not limited to the above-described Preparation Example and Example, and various modifications and improved forms by those skilled in the art using the basic concept of the present disclosure as defined in the following claims are also included in the right scope of the present disclosure.

What is claimed is:

1. A polymer electrolyte membrane fuel cell comprising:

an electrolyte membrane;

a cathode disposed on a surface of the electrolyte membrane; and an anode disposed on an opposite surface of the electrolyte membrane, wherein at least one of the electrolyte membrane, the cathode, the anode, or a combination thereof comprises an additive, wherein the additive comprises a perovskite compound represented by $Ce(Zr_xTi_{1-x})O_3$, wherein x satisfies $0<x<1$, and the additive further comprises a carbon material having a predetermined shape, and wherein the perovskite compound is deposited on the carbon material.

2. The polymer electrolyte membrane fuel cell of claim 1, wherein the carbon material comprises a spherical carbon material, a fibrous carbon material, or a combination thereof.

3. The polymer electrolyte membrane fuel cell of claim 1, wherein the perovskite compound has a peak at a (110)

plane, a peak at a (112) plane, a peak at a (200) plane, a peak at a (122) plane, and a peak at a (220) plane as measured by X-ray diffraction (XRD).

4. The polymer electrolyte membrane fuel cell of claim 3, wherein the peak at the (110) plane of the perovskite compound is downshifted compared to that of a compound in which zirconium (Zr) is not substituted.

5. The polymer electrolyte membrane fuel cell of claim 1, wherein the electrolyte membrane comprises 98% by weight to 99.5% by weight of an ionomer and 0.5% by weight to 2% by weight of the additive.

6. The polymer electrolyte membrane fuel cell of claim 1, wherein the at least one of the electrolyte membrane, the cathode, the anode, or a combination thereof comprising the additive is the cathode, and wherein the cathode comprises:

a catalyst in which an active metal is supported on a support;

an ionomer; and the additive.

* * * * *